Nov. 26, 1957

E. L. MINNICH ET AL 2,814,741

CRYSTAL MOUNTING MEANS

Filed Feb. 10, 1955

2 Sheets-Sheet 1

INVENTORS.
EDWARD L. MINNICH
CHARLES W. MANN
BY [signature]
ATTORNEY.

Nov. 26, 1957 E. L. MINNICH ET AL 2,814,741

CRYSTAL MOUNTING MEANS

Filed Feb. 10, 1955 2 Sheets-Sheet 2

INVENTORS.
EDWARD L. MINNICH
CHARLES W. MANN
BY
ATTORNEY.

United States Patent Office 2,814,741

Patented Nov. 26, 1957

2,814,741

CRYSTAL MOUNTING MEANS

Edward L. Minnich and Charles W. Mann, Carlisle, Pa., assignors, by mesne assignments, to Standard Electronics Corporation, Newark, N. J., a corporation of Delaware Application February 10, 1955, Serial No. 487,326

8 Claims. (Cl. 310—9.1)

This invention relates to improvements in piezoelectric crystals and is concrned particularly with improved means for mounting crystals and/or crystal and electrode assemblies.

A principal object of the invention is very materially to improve standard types of crystal devices. For example, the metal, hermetically sealed holder commonly known by the designation, HC-6/U was designed originally for using quartz plates having plated metal electrodes and supported by metal springs or clips. This type of mounting is relatively simple and compact but the power dissipating capabilities of the crystal are limited. Efforts have been made to increase the power handling capabilities of units of this type by providing separate more massive electrodes supported on an insulating medium clamped to the quartz crystal surfaces. However, the mounting of such crystal and electrode assemblies within the holder presents a difficult problem because of the limited space and is particularly troublesome at the higher frequencies at which the crystal units are manufactured because the shunt capacity of the assembly is increased due to the higher dielectric constants of the various insulating materials necessarily employed and the proximity of these materials to the metal enclosure. The present invention overcomes the foregoing and other limitations and disadvantages of prior types of crystal devices including particularly the HC-6/U.

More specifically, the present invention provides for the mounting of the quartz plate and electrodes in limited space and the extremely simple assembly of the same in any suitable type of crystal unit; it provides for a crystal supporting structure which is mechanically stable thus rendering the unit immune to vibration and shock; it provides for a crystal mounting which reduces the unwanted shunt capacity within the crystal unit to a minimum; it provides for a quartz plate and electrode assembly capable of dissipating substantially greater amounts of power than heretofore and it also provides for a pressure mounted crystal and electrode assembly which is exceedingly simple to manufacture and which can be rapidly and efficiently produced in large quantities.

Other and further objects and advantages of the invention will be apparent from the following detailed explanation taken in conjunction with the accompanying drawings wherein a preferred embodiment of the principles of the invention has been selected for exemplification.

Figure 1:
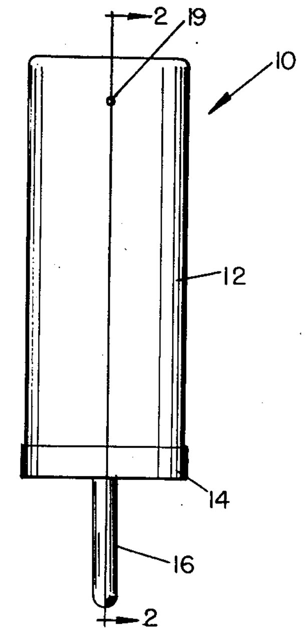
Fig. 1 is a side elevational view of a crystal holder in which the novel crystal mounting and assembly arrangement of the present invention is embodied.

Referring more particularly to the drawings, wherein like numerals refer to like parts, a crystal device or unit constructed in accordance with the present invention is indicated in its entirety at 10. As shown, the cover or can 12 is secured to the base or header 14 of insulating material through which the usual conductors 16 extend preferably secured to the base by glass seals 18. A breather port 19 may be provided in the cover 12 for the removal of air and moisture during the sealing operation. The holder 14 and cover 12 are intended to be illustrative of the HC-6/U or any other standard or special type of crystal holder and cover.

Coming now to the novel and inventive features of the device, crystal supporting or mounting means are provided in the form of a nest 20 of insulating material having a low dielectric constant which preferably may be molded as a unitary block. A transverse central slot 22 is provided in the nest 20 of dimensions sufficient to receive the quartz crystal 24 and electrode 26 assembly or sandwich. As shown, the nest 20 substantially fits within the cover 12 and the slot 22 therein provides an efficient support for the crystal plate thus to dispense with the mounting springs or clips heretofore employed. It will also be apparent that the nest or block 20 substantially surrounds and fully protects the crystal supported therein. It may sometimes be desirable to interpose an insulating strip 27 of low dielectric material between the exposed edges of the crystal-electrode assembly and the adjacent inner faces of the metal cover 12 further to insulate the assembly from the cover as well as further to protect the assembly from damage during mechanical shocks.

For pressure retention of the crystal-electrode assembly in the slot 22, a pair of longitudinal slots 28 are provided in the block 20 at opposed sides of and in communication with the transverse slot 22 for receiving springs 30 having elbows 32 which bear against the adjacent electrodes 26. The springs 30 are formed of suitable conducting material and serve the additional function of providing electrical connection between the contact areas 44 on the outer faces of the electrodes and the conductor pins 16 to which the laterally bent bottom ends of the springs 30 are secured, as shown.

Figure 3:
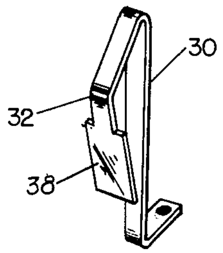
Fig. 3 is a detail perspective view of one of the contact springs shown in Fig. 2.

In the preferred construction, the longitudinal slots 28 are formed with shoulders 36 and the free ends of the springs 30, as shown in Fig. 3, are provided with enlarged portions 38 which bear against these shoulders rather than the upright portions of the spring members 30 which otherwise might be bent outwardly with tendency to strain or fracture the glass seals 18.

To facilitate the removal of air and moisture from the interior of the device prior to the sealing of the cover 12 and base 14, it is desirable to provide a channel in the nest or block 20 communicating with the breather port 19 whereby suction may be applied to all interior space areas and such a channel is conveniently provided by reducing one upright end portion of the block as indicated at 40 and positioning the asymmetrical block in the cover 12 with the shortened end portion adjacent the port 19.

Figures 4, 5, 6:
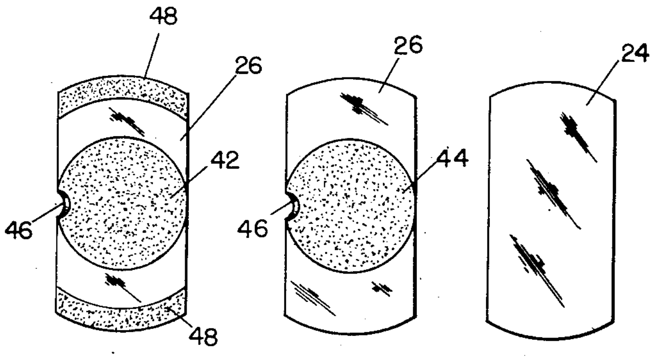
Fig. 4 is an elevational view of the inner face of one of the electrodes shown in Fig. 2.
Fig. 5 is an elevational view of the outer face or opposite face of one of the electrodes.
Fig. 6 is an elevational view of the quartz crystal plate as shown as interposed between the electrodes in Fig. 2.
Figure 7:
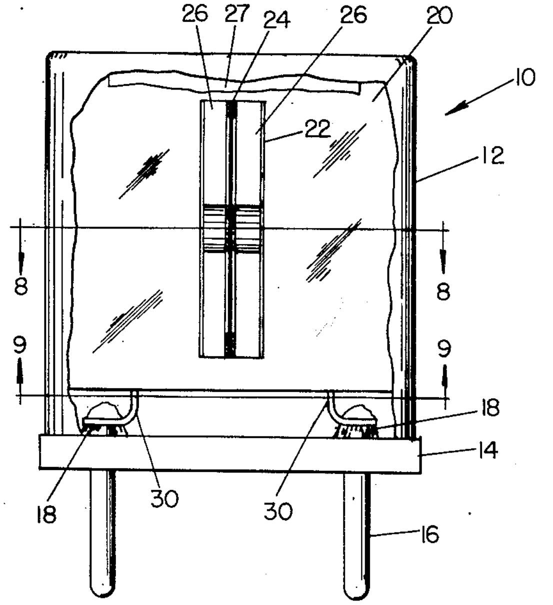
Fig. 7 is a front elevational view of the crystal device as shown in Fig. 1 with the cover and insulating strip partly broken away.
Figure 8:
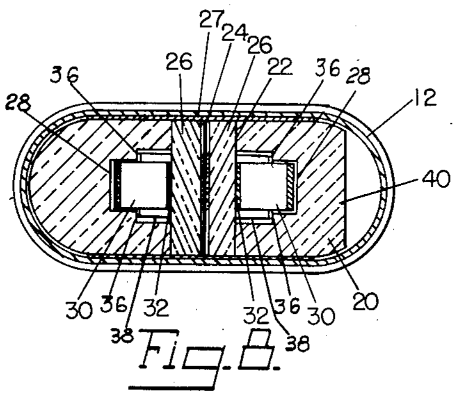
Fig. 8 is a horizontal sectional view taken along the line 8—8 of Fig. 7 and looking in the direction of the arrows.
Figure 9:
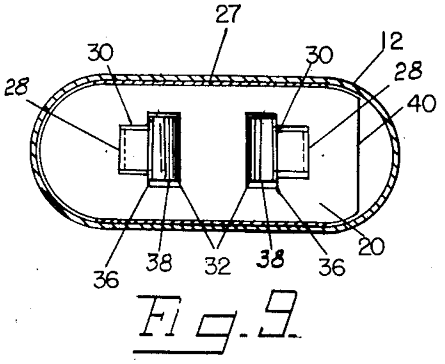
Fig. 9 is a horizontal sectional view taken along the line 9—9 of Fig. 7 and looking in the direction of the arrows.

The preferred forms of the quartz crystal and electrode elements are best shown in Figs. 4–6. These elements preferably are of a width corresponding substantially with the thickness of the block 20 as indicated in Fig. 8. While rectangular crystals may be employed, it has been found more desirable to employ the form of crystal as shown at 24 in Fig. 6 having straight parallel side edges and intermediate arcuate edges. Thus, a circular disc form of crystal blank may be ground to a specified thickness in accordance with the desired frequency in the usual manner with minimum liklihood of breakage. The opposed side chords may then be removed by grinding the side edges of the disc perpendicular to the X—X′ axis.

The electrodes 26, preferably formed of quartz or ceramic material, are of similar configuration and are provided with a plated metal electrode 42 on one major face and a plated metal contact area 44 on the opposite major face. A plated electrical contact strip 46 extends from the plate electrode 42 to the plated contact area 44 and is preferably disposed in a notch cut in the side edges of the pieces, as shown in Figs. 4 and 5. Relatively heavily plated land strips 48 are preferably provided bordering the arcuate edges of the electrode carrying face of the pieces 26 as shown in Fig. 4 whereby suitably to space the electrodes 42 from the interposed quartz plate 24.

Figure 2:
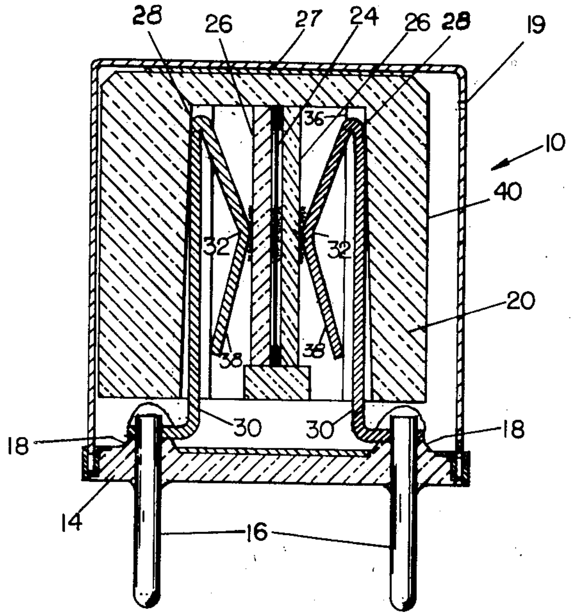
Fig. 2 is a vertical sectional view taken along the line 2—2 of Fig. 1 and looking in the direction of the arrows.

It will be apparent that assembly of the crystal devices constructed in accordance with the present invention is a relatively simple and speedy operation. The spring-conductors 30 are soldered or otherwise suitably secured to the inner ends of the pins 16 so that they extend upright as shown in Fig. 2. The quartz crystal plate 24, ground to the desired frequency, is sandwiched between the electrode faces of the electrode pieces 26 and the assembly is inserted in the slot 22 of the block or nest 20 which is then mounted upon the base 14 by insertion of the spring-conductors 30 within the parallel slots 28 so that the spring elbows 32 thereof bear against the adjacent contact faces of the electrodes 26, as also shown in Fig. 2. The protective insulating strip 27 is wrapped over the nest 20 at the entrance portions of the slot 22 and the cover or can 12 is applied over the nest 20 to the base 14 with the breather port 19 adjacent the reduced edge portion 40 of the nest whereby to facilitate the usual air or moisture removal and sealing operations.

It is to be understood that the present invention is not confined to the precise construction and arrangement of parts as herein illustrated and described but embraces all such variations and modifications thereof as come within the broad scope of the following claims.

We claim:

1. Supporting means for a piezoelectric oscillator plate which comprises, a body of insulating material, a transverse recess in said body for receiving a piezoelectric oscillator plate, and upright recesses in said body at opposed sides of and communicating with said transverse recess for receiving spring members to bear against opposed sides of said plate whereby to retain said plate in said transverse recess.

2. Supporting means for a piezoelectric oscillator plate which comprises, a block of insulating material having opposed side and end walls and a bottom wall, a transverse recess in said block extending between said sidewalls for receiving a piezoelectric oscillator plate, and upright recesses in said block at opposed sides of and in communication with said transverse recess, the said upright recesses opening from said bottom wall and being adapted to receive spring members to bear against opposed sides of said plate whereby to retain said plate in said transverse recess.

3. Supporting means for a piezoelectric oscillator plate which comprises, a block of insulating material having opposed side and end walls and a bottom wall, a transverse recess in said block extending between said sidewalls for receiving a piezoelectric oscillator plate, and upright recesses in said block opening from said bottom wall and disposed at opposed sides of and in communication with said transverse recess, the said upright recesses including shoulders at opposed sides thereof and being adapted to receive spring members to bear against opposed sides of said plate whereby to retain said plate in said transverse recess.

4. In combination with a piezoelectric oscillator plate, supporting means therefor which comprises, a body of insulating material, a transverse recess in said body, the said oscillator plate being disposed in said transverse recess, upright recesses in said body at opposed sides of and in communication with said transverse recess and spring members supported in said upright recesses to bear against opposed sides of said plate whereby to retain said plate in said transverse recess.

5. In combination with a piezoelectric oscillator plate and separable electrodes, supporting means therefor which comprises, a body of insulating material, a transverse recess in said body, the said piezoelectric oscillator plate assembled between said separable electrodes being disposed in said transverse recess, upright recesses in said body at opposed sides of and in communication with said transverse recess and electrical conducting members supported in said upright recesses in electrical contact with said electrodes, the said conducting members including spring members bearing against said electrodes whereby to retain said plate and electrode assembly in said transverse recess.

6. In combination with a piezoelectric oscillator plate, supporting means therefor which comprises, a block of insulating material having opposed side and end walls and a bottom wall, a transverse recess in said block extending between said side walls, the said oscillator plate being disposed in said transverse recess, upright recesses in said block at opposed sides of and in communication with said transverse recess, the said upright recesses opening from said bottom wall, and spring means supported in said upright recesses to bear against opposed sides of said plate whereby to retain said plate in said transverse recess.

7. A piezoelectric crystal device which comprises, an outer casing, an oscillator plate and means for supporting said oscillator plate within said casing, the said supporting means comprising, a body of insulating material, a transverse recess in said body, the said oscillator plate being disposed in said transverse recess, upright recesses in said body at opposed sides of and in communication with said transverse recess and spring members supported in said upright recesses to bear against opposed sides of said plate whereby to retain said plate in said transverse recess.

8. A piezoelectric crystal device which comprises, an outer casing, an oscillator plate and means for supporting said oscillator plate within said casing, the said supporting means comprising, a block of insulating material having opposed side and end walls and a bottom wall, a transverse recess in said block extending between said side walls, the said oscillator plate being disposed in said transverse recess, upright recesses in said block at opposed sides of and in communication with said transverse recess, the said upright recesses opening from said bottom wall, and channel means at one end of said block communicating said recesses with a breather port provided in said outer casing for exhausting air from said recesses.

References Cited in the file of this patent

UNITED STATES PATENTS

| | | |
|---|---|---|
| 2,386,692 | Kuenstler | Oct. 9, 1945 |
| 2,404,445 | Kuenstler | July 23, 1946 |

FOREIGN PATENTS

| | | |
|---|---|---|
| 131,233 | Sweden | Apr. 10, 1951 |